3,156,678
Patented Nov. 10, 1964

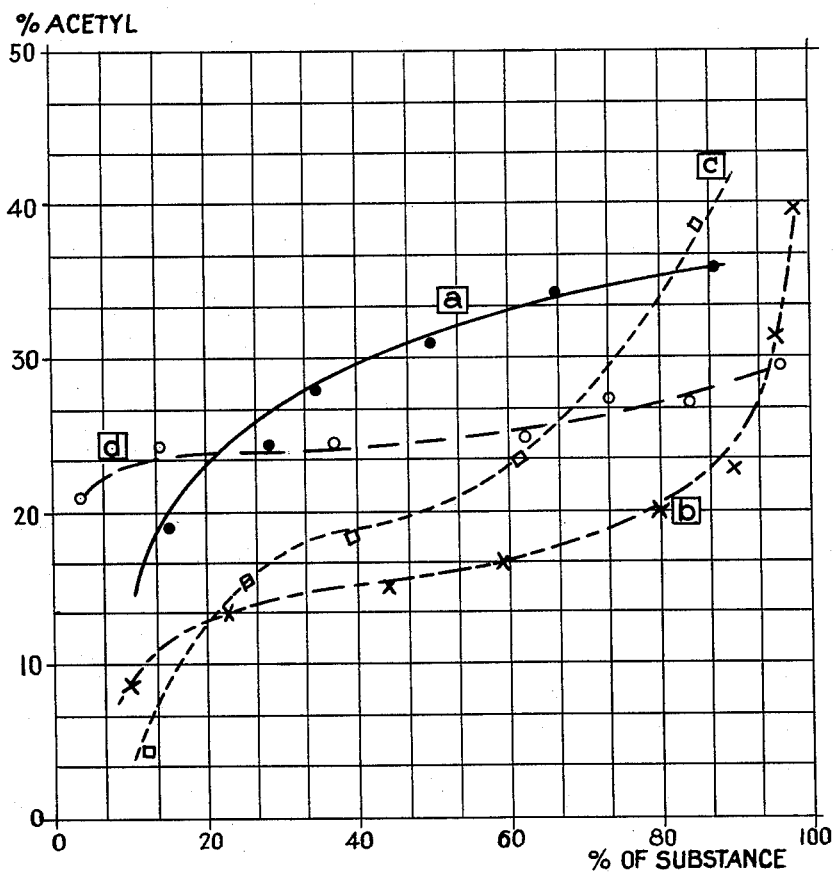
FIG. I.
INTEGRAL DISTRIBUTION CURVE OF THE CHEMICAL COMPOSITION
OF SOME PARTIALLY SAPONIFIED POLYVINYL ACETATES
□-----□ AVERAGE ACETYL CONTENT 20% COMMERCIAL PRODUCT
○— —○ " " " 25% ACCORDING TO INVENTION
×—--—× " " " 16% INTERRUPTION OF REACTION
●———○ " " " 27% WITHOUT MIXING
INVENTORS
HANS DEXHEIMER
OTTO FUCHS
MICHAEL LEDERER
WERNER SCHMIEDER

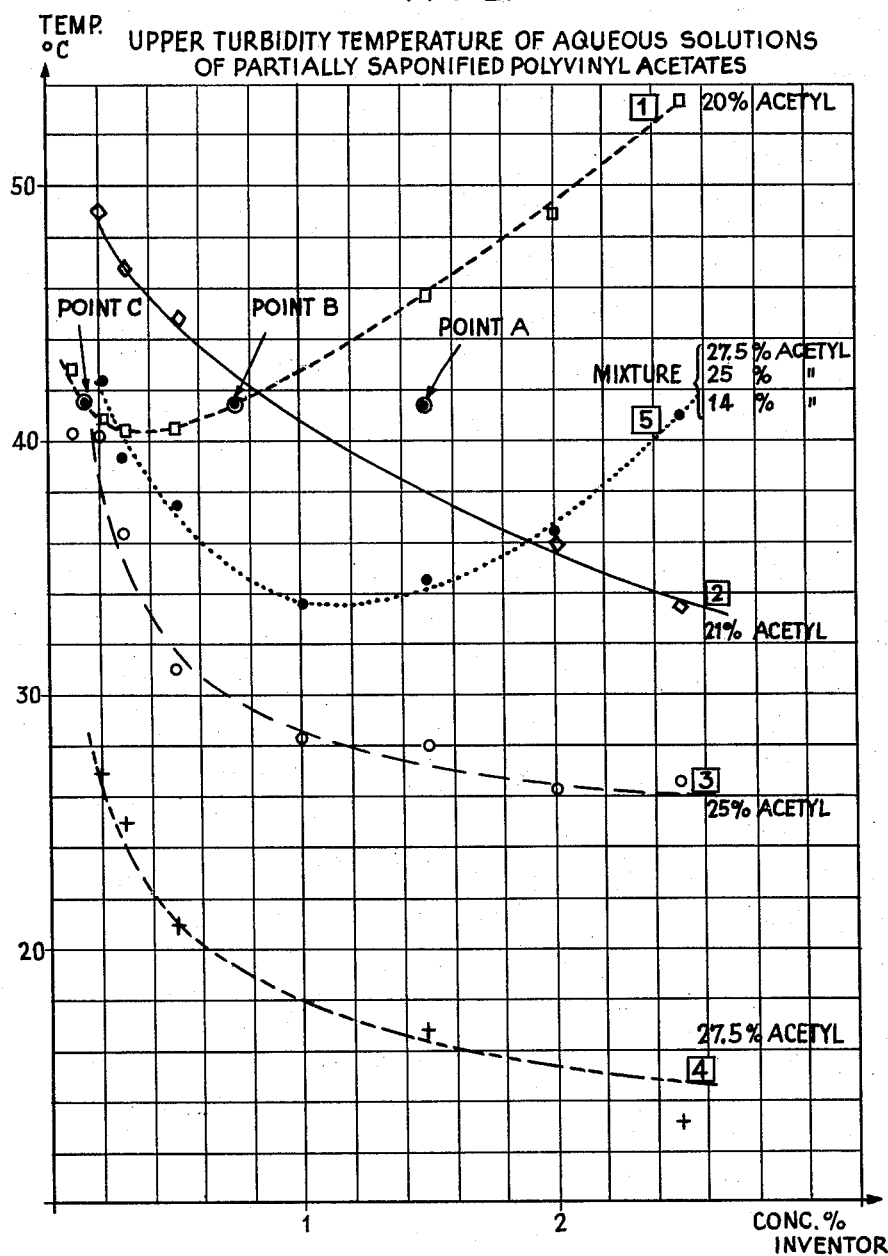

3,156,678
PROCESS FOR THE MANUFACTURE OF PARTIALLY SAPONIFIED POLYVINYL ESTERS
Hans Dexheimer, Kelkheim, Taunus, Otto Fuchs, Hofheim, Taunus, Michael Lederer, Frankfurt am Main, and Werner Schmieder, Hofheim, Taunus, Germany, assignors to Farbwerke Hoechst Aktiengesellschaft vormals Meister Lucius & Brüning, Frankfurt am Main, Germany, a corporation of Germany
Filed Aug. 10, 1961, Ser. No. 130,544
Claims priority, application Germany, Aug. 18, 1960, F 31,905
7 Claims. (Cl. 260—89.1)

The present invention relates to a process for the manufacture of partially saponified polyvinyl esters.

It is known to react a polyvinyl ester dissolved in an alcohol with catalytic amounts of sodium hydroxide or potassium hydroxide or sodium alcoholate or potassium alcoholate to obtain polyvinyl alcohol. Still further, it is known that by the addition of, for example, acid or water (British patent specifications Nos. 692,324 and 725,717) the reaction can be interrupted prematurely and a partially saponified polyvinyl ester can thus be prepared. Furthermore, it is known that part of the alcohol used for dissolution can be replaced by the corresponding ester formed in the reaction (cf. U.S. Patent 2,640,816) and by an appropriate selection of the composition of the batch the reaction can be brought to a premature standstill or considerably retarded, which facilitates a stop of the reaction. In the latter case, the viscosity of the batch passes during the reaction a steep maximum which is so high at a high polyvinyl ester concentrattion that during said phase the batch cannot be stirred. Since, however, a high concentration is desirable for obtaining a high space-time yield, an intensive mixing is dispensed with (British specifications cited above). In a batch in which the degree of saponification can be adjusted by interrupting the reaction such a high maximum does not occur.

The methods described above yield chemically non uniform products. By, chemically uniform products there are to be understood products in which the ratio of the number of OH groups to the number of residual ester groups is constant in all macromolecules independent of their size. In contradistinction thereto said ratio varies within wide limits in non uniform products.

It has now been found that partially saponified polyvinyl esters, which have surprisingly a high chemical uniformity, can be obtained when a polyvinyl ester, which is dissolved in a solvent mixture containing an alcohol and the ester of said alcohol with the acid portion of said polyvinyl ester, is subjected to a partial alcoholysis in the presence of an alkaline catalyst and thus partially saponified. In the process of the invention the composition of the solvent mixture consisting of an alcohol, for example, methanol, ethanol or propanol, and the ester is chosen in a manner such that the proportion of ester to alcohol is 50:1 to 2.5:1 and preferably 6:1 to 3:1. The concentration of the polyvinyl ester, calculated on the total batch shall not exceed the values defined in the following table which depend on the η red value of the polyvinyl ester (determined with a 1% solution of the polymer in ethyl acetate at 25° C. in an Oswald Viscometer). As catalyst there is used an alkali metal hydroxide, for example sodium or potassium hydroxide, or an alkali metal alcoholate, for example sodium or potassium methylate, in an amount of about 0.1 to 2% and preferably 0.5 to 1%, calculated on the polyvinyl ester. The alcoholysis is carried out at a temperature between about 0° C. and the boiling point of the solvent mixture, advantageously between 10 and 30° C. in a practically anhyrous medium. Severe care is to be taken that during the whole period of reaction the mixture is intensely mixed and the reaction is not interrupted, for example by the addition of water or acids.

The concentration or the η red value of the polyvinyl ester, respectively, in the solution to be saponified shall not exceed the following limits:

| Maximum concentration of polyvinyl ester in the solution to be saponified: | η Red value of polyvinyl ester |
|---|---|
| 9 grams/100 cc. | 2.45 |
| 16 grams/100 cc. | 0.80 |
| 32 grams/100 cc. | 0.41 |
| 42 grams/100 cc. | 0.15 |

It results from the table that with an increasing η red value the concentration of the solution to be saponified must be reduced and vice versa. With the aid of the examples recited in the above table those skilled in the art will be in a position to find the maximum concentration of polyvinyl ester for a respective η red value.

In general the viscosity of a batch, determined at a drop in speed of $D=88$ sec$^{-1}$ in a rotation viscometer, shall not exceed in the course of the reaction a maximum value of 12,000 centipoises and preferably 8,000 centipoises.

On account of their high chemical uniformity the products of the invention have solubility properties that differ considerably from those of products prepared by known processes with reaction interruption or without permanent mixing as results from the following:

In the accompanying drawings FIGURE 1 represents for polyvinyl acetate the distribution curves of the chemical compositions of (a) a product produced without mixing, (b) a product made with interruption of the reaction, (c) a commercial product, and (d) a product obtained by the process of the invention. The curves were obtained in accordance with the indications in "Verhandlungsberichte der Kolloid-Gesellschaft," volume 18 (1958), pages 75–81 by O. Fuchs. FIGURE 2 illustrates the differences in the solubility properties in water. It is known that partially saponified polyvinyl esters have a negative temperature coefficient of solubility in water, i.e. that they are soluble in the cold and precipitate on heating. In FIGURE 2 are plotted for various productcs the temperatures above which the solution becomes turbid by precipitation (turbidity temperatures) against the concentration of the solution. Curve 1 is the curve of a commercial product containing 20% of acetyl (the chemical distribution of which is shown in curve c of FIGURE 1) and curves 2 to 4 are the curves of products prepared by the process of the invention and containing 21, 25 and 27.5% of acetyl, respectively. The minimum of the turbidity temperature of curve 1 is attributed to the chemical non uniformity and this is proved by the fact that a non uniform substance artificially prepared by mixing equal parts of three uniform substances having different acetyl contents has qualitatively the same behavior (curve 5) as the commercial product (curve 1).

The solubility effect represented in curves 2–4 compares favorably with that of curve 1 in that no precipitations can form on diluting with water. In the case of curve 1 a precipitation is formed when the solution is diluted, which leads to a non-homogeneous product. These inhomogeneities have a very unfavorable effect, for example in the manufacture of paints with the use of polyvinyl alcohols as thickening agents by the formation of lumps. When, for example, a solution of a product characterized by curve 1 and having a concentration and temperature as defined by point A is diluted the curve 1 is reached at point B and precipitation takes place up to point C. Below the concentration at point C the polyvinyl acetate is again soluble, but precipitated portions do not pass into solution immediately.

The process of the invention is applicable to a wide range of saponifiable polyvinyl esters, for example polymers of esters of vinyl alcohol with monobasic, saturated, aliphatic carboxylic acids having 1 to 18 carbon atoms in a straight or branched chain, or polymers of esters of vinyl alcohol with monobasic aromatic carboxylic acids. Suitable polyvinyl esters are, for example, polyvinyl formate, polyvinyl propionate, polyvinyl butyrate, polyvinyl stearate, and polyvinyl benzoate. As polymers of vinyl esters that are partially saponifiable there may furthermore be used vinyl ester copolymers, for example copolymers of two vinyl esters, such as copolymers of vinyl acetate and vinyl propionate. By the process of the invention there can also be partially saponified graft polymers of one or several vinyl esters on polymers of 1,2-epoxy hydrocarbons, for example a graft polymer of vinyl acetate on polyethylene glycol or a hydroxyethylated polypropylene glycol. The process of the invention is especially suitable for the manufacture of partially saponified polyvinyl acetate. The special composition of the total batch must be empirically adjusted each time in a test series to the respective polyvinyl ester to be partially saponified. In general the batch contains the following components: polyvinyl ester, for example polyvinyl acetate, alcohol, for example methanol, ester, for example methyl acetate, and the alkaline catalyst. The degree of alcoholysis of the final product can be varied within wide limits by an appropriate selection of the composition and the temperature of the batch.

The partially saponified polyvinyl esters prepared by the process of the invention are especially suitable as thickening agents in the manufacture of aqueous paint formulations.

The following examples serve to illustrate the invention, but they are not intended to limit it thereto; the parts being by weight unless otherwise stated.

*Example 1*

In a vessel provided with a jacket for maintaining the temperature and a vigorous stirrer 10 parts of polyvinyl acetate (acetyl content 50%) having an $\eta$ red value of 0.41 (determined with a 1% solution of the polymer in ethyl acetate at 25° C. in an Oswald viscometer) were dissolved while stirring in a mixture of 48.7 parts of methyl acetate and 6.8 parts of methanol. The temperature of the solution was adjusted to 23° C. and a solution of 0.1 part of sodium hydroxide in 0.79 part of methanol was added. While continuously stirring, the reaction took place with a strong increase of the viscosity and the solution became turbid. After 20 minutes the viscosity maximum was reached and the batch became thinner while the turbidity remained. The reaction was terminated after 3 hours and the stirrer was switched off. The partially saponified polyvinyl acetate obtained still contained 28.1% of residual acetyl. The batch could be stored without further treatment without any modification of the product taking place. The product could be converted into aqueous solution by steam distillation or isolated by evaporation.

*Example 2*

The process was carried out as described in Example 1 with the same amounts of substances and at the same temperature, with the exception that the polyvinyl acetate used had an $\eta$ red value of 0.8. The solution obtained was considerably more viscous than the solution of Example 1 and the viscosity maximum was higher, the time of reaction being the same. The product had a residual acetyl content of 14.1%. The product obtained was likewise stable in storage.

*Example 3*

The process was carried out as described in Example 1 with the exception that the solvent was a mixture of 47.8 parts of methyl acetate, 7.59 parts of methanol and 0.125 parts of water. The product had a residual acetyl content of 34.6%. The product obtained was insoluble in water and thus could not be transferred into aqueous solution by a steam distillation.

*Examples 4–11*

Examples 4–11 were carried out in the same manner as Examples 1 to 3. The variables are recited in the following table. Each time part of the methanol indicated in the fourth column was used for dissolving the sodium hydroxide catalyst.

| 1 | 2 | | 3 | 4 | 5 | 6 | 7 | 8 |
|---|---|---|---|---|---|---|---|---|
| No. | Polyvinyl parts | Acetate $\eta$ red | Methyl acetate parts | Methanol parts | Water part | NaOH part | Temp., ° C. | Residual acetyl, percent |
| 4 | 10 | 0.41 | 46 | 9.48 | ---------- | 0.1 | 0 | 20.4 |
| 5 | 20 | 0.41 | 46 | 11.15 | ---------- | 0.1 | 25 | 34.5 |
| 6 | 10 | 0.41 | 49.5 | 6.92 | 0.125 | 0.1 | 23 | 36.3 |
| 7 | 10 | 0.41 | 46 | 11.05 | ---------- | 0.1 | 35 | 21.7 |
| 8 | 5 | 2.45 | 46 | 4.66 | ---------- | 0.05 | 25 | 24.1 |
| 9 | 10 | 0.41 | 46 | 0.79 | ---------- | 0.1 | 25 | 46.4 |
| 10 | 10 | 0.41 | 41.9 | 12.72 | ---------- | 0.1 | 23 | 4.3 |
| 11 | 10 | 0.8 | 69 | 8.6 | ---------- | 0.1 | 25 | 28.4 |

*Examples 12–14*

These examples were carried out with a graft polymer of 85% of vinyl acetate on 15% of polyethylene oxide (42.5% of acetyl) as described in the preceding examples.

| 1 | 2 | 3 | 4 | 5 | 6 | 7 | 8 |
|---|---|---|---|---|---|---|---|
| No. | Graft polymer parts | Methyl acetate parts | Methanol parts | Water part | NaOH part | Temp., ° C. | Residual acetyl, percent |
| 12 | 10 | 46.5 | 14.3 | ---------- | 0.1 | 23 | 14.7 |
| 13 | 10 | 23 | 14 | ---------- | 0.05 | 23 | 23.2 |
| 14 | 10 | 15 | 14 | ---------- | 0.05 | 23 | 18.5 |

*Example 15*

10 parts of a graft polymer of 50% of vinyl acetate on 50% of polyethylene oxide (25% of acetyl) were dissolved in 51 parts of methyl acetate and 6.3 parts of methanol and reacted in the presence of 0.1 part of NaOH as described in the preceding examples. The product obtained had a residual acetyl content of 14.5%.

*Examples 16–18*

A polyvinyl acetate having an $\eta$ red value of 0.41 was reacted in a mixture of ethanol and ethyl acetate as described in the preceding examples. The variables are listed in the following table.

| No. | Polyvinyl acetate parts | Ethyl acetate parts | Ethanol parts | Water part | NaOH part | Temp., °C. | Residual acetyl, percent |
|---|---|---|---|---|---|---|---|
| 16 | 10 | 45 | 10.7 | | 0.1 | 23 | 41 |
| 17 | 10 | 34 | 21.5 | | 0.1 | 23 | 34.3 |
| 18 | 10 | 22.5 | 30.5 | | 0.1 | 23 | 29.8 |

*Example 19*

10 parts of a polyvinyl acetate having an $\eta$ red value of 0.41 were dissolved in a mixture of 42 parts of iso-propyl acetate and 13.4 parts of iso-propanol and reacted as described in the preceding examples in the presence of 0.1 part of NaOH. The product obtained has a residual acetyl content of 14.5%.

We claim:

1. A process for the manufacture of a partially saponified polyvinyl ester which comprises stirring with an alkaline catalyst a polyvinyl ester in a solvent mixture consisting essentially of (1) an alcohol and (2) the ester of said alcohol and the acid portion of said polyvinyl ester while maintaining a ratio of component (2) to component (1) of the solvent mixture in the range between 50:1 and 2.5:1.

2. The process of claim 1 wherein the ratio of component (2) to component (1) of the solvent mixture is maintained in the range between 6:1 and 3:1.

3. The process of claim 1 wherein the polyvinyl ester is polyvinyl acetate.

4. A process for the preparation of a partially saponified polyvinyl acetate which comprises stirring polyvinyl acetate with an alkaline catalyst in a substantially anhydrous solvent mixture consisting essentially of an alcohol and the acetic acid ester of said alcohol while maintaining the ratio of ester to alcohol in the range between about 50:1 and 2.5:1.

5. The process defined in claim 4 wherein the alcohol is methanol and the ester is methyl acetate.

6. The process defined in claim 4 wherein the alcohol is ethanol and the ester is ethyl acetate.

7. The process defined in claim 4 wherein the alcohol is iso-propanol and the ester is iso-propyl acetate.

References Cited in the file of this patent

UNITED STATES PATENTS

| | | |
|---|---|---|
| 2,467,774 | Plambeck | Apr. 19, 1949 |
| 2,640,816 | Germain | June 2, 1953 |
| 2,940,948 | Halbig et al. | June 14, 1960 |
| 3,036,054 | Wheeler | May 22, 1962 |

FOREIGN PATENTS

| | | |
|---|---|---|
| 692,324 | Great Britain | June 3, 1953 |
| 725,717 | Great Britain | May 9, 1955 |